J. A. CARTER.
PNEUMATIC WHEEL.
APPLICATION FILED SEPT. 10, 1917.
1,285,618.
Patented Nov. 26, 1918.
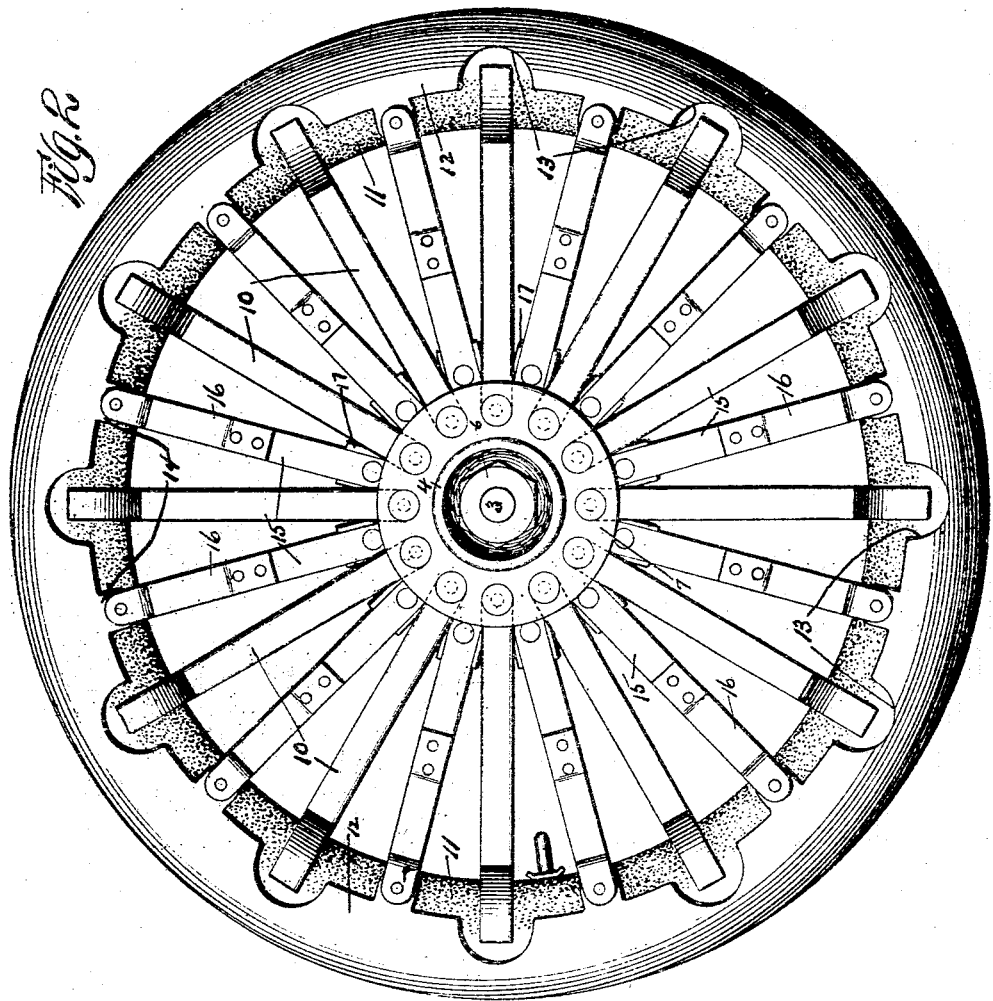
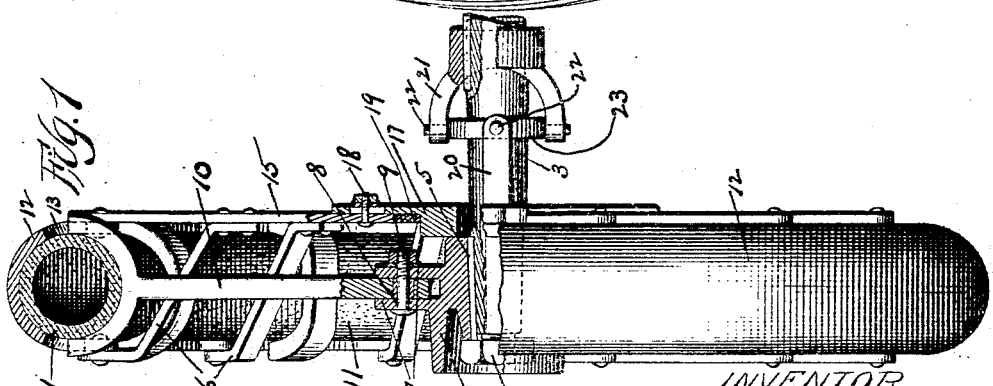
INVENTOR
J. A. CARTER

UNITED STATES PATENT OFFICE.

JAMES A. CARTER, OF ST. LOUIS, MISSOURI.

PNEUMATIC WHEEL.

1,285,618. Specification of Letters Patent. Patented Nov. 26, 1918.

Application filed September 10, 1917. Serial No. 190,571.

*To all whom it may concern:*

Be it known that I, JAMES A. CARTER, a citizen of the United States, residing at the city of St. Louis, State of Missouri, have invented a certain new and useful Improvement in Pneumatic Wheels, of which the following is a specification, reference being had to the accompanying drawing, forming a part thereof.

This invention relates generally to pneumatic wheels, and, more particularly, to a certain new and useful improvement in armored pneumatic drive-wheels for automobiles and the like, the objects of my present invention being to provide a pneumatic wheel construction having a relatively inflexible armor or shoe, preferably of suitable sheet metal, constituting the wheel-tread, and arranged to cover only the outer perimetrical or tread surface of the pneumatic tube or cushion, leaving the inner perimetrical surface of the tube exposed for direct engagement with spokes in turn connected with the axle, whereby a greater cushioning effect or activity of a limited area of the pneumatic tube is brought to play on the axle in the absorption of tread impacts or shocks as against the larger cushioning areas involved where continuous rims are employed; to provide a pneumatic wheel construction wherein an inflexible and circular armor, comprising the "tread", and a pneumatic tube, partially inclosed by the armor, are independently connected with the driving-axle by means which permit certain relative movements, diametrically and axially, of the armor and tube in order to cushion the axle against shocks and impacts, but which axle, armor, and tube are related as a system for synchronous rotational movements, in order to obtain a positive drive effect on both armor and tube and thus obviate wear by abrasion between the armor and tube; to provide means in such driving connections to absorb tread impacts or shocks delivered at angles to the normal wheel alinement; and to improve generally upon pneumatic wheels of the type stated.

With the above and other objects in view, my invention resides in certain novel features of form, construction, arrangement, and combination of parts, all as will hereinafter be described and afterward pointed out in the claims.

In the accompanying drawing, which illustrates the preferred embodiment of my invention.

Figure 1 is an edge view, partly in section, of a wheel constructed according to my invention; and Fig. 2 is a side elevational view of the wheel.

Referring to the said drawing, by numerals, 3 indicates the driving axle connected as common with the transmission, not shown, and having mounted thereon, adjacent its outer end, a hub 4 held non-rotatably thereto by a key or the like 5 and against axial movements thereon by a nut or the like 6.

Carried by the hub, at an approximate median point axially, is a pair of outstanding flanges 7, which are relatively spaced and parallel and through which are formed axially alined holes or apertures 8 arranged to receive pivot-bolts 9 carrying outwardly projecting spokes 10. These spokes 10 are furcated at their free, outer ends to straddle a suitable pneumatic tube 11, which surrounds all of the said spoke-ends and is directly engaged thereby, as shown.

Surrounding the pneumatic tube 11, is an annular or circular armor or shoe 12, preferably constructed of suitable sheet metal and whose cross-section is arcuated to conform with the tube 11 when inflated, the armor or shoe 12 sectionally covering the tread and only parts of the sides of the tube 11 and being formed to present an endless or continuous armored tread for the pneumatic tube.

At intervals, corresponding to the normal spacing of the spokes 10, the sides of the armor 12 are provided with notches 13 which allow free diametrical movements of the spokes 10 relatively to the armor and also certain limited rotational movements of the spokes relatively to the armor when the tube is inflated, in order to limit wheel distortion under normal conditions, and which furcated spoke-ends and notched armor-sides provide for a preservation of spoke-spacing under abnormal conditions, such as a complete, or nearly complete, deflation of the pneumatic tube, to the end that the wheel is capable of carrying its load, as a "solid" wheel, without danger of collapse and without injury to the pneumatic tube, as by "rim cutting".

On each side of the armor, intermediately the notches 13, are marginally projecting ears 14, related as axially alined pairs and perforated, the ears 14 on the innermost side being connected with spokes 15 in radial arrangement and paralleling the wheel "line", and the ears 14 on the outermost side being connected with struts 16 leading from the spokes, whereby, when stress is applied to the spokes for tread drive, the tendency toward torque or torsional strain on the armor will be obviated.

Surrounding the axle, in the plane of the spokes 15, is a spider 17, whose hub is centrally apertured in excess of the axle diameter so as to be free to move at varying angles relatively to the axle as may be caused by temporary deflections of the wheel from its alined position, and which spider comprises arms in radial correspondence with the spokes 15 and to which said spokes are connected by slot-and-pin connections 18, in order to compensate partially for armor distortion, under abnormal conditions, and which distortion is, in part, provided for by cushion-blocks 19 arranged between the inner spoke-ends and the spider-arms.

Carried by the spider at diametrically opposite points, and in parallelism with the axle, are tines 20, and fixed to the axle against both longitudinal and independent rotational movement, is a fork 21, whose tines, like the tines 20, are provided with openings at their free ends to receive pins 22 carried in "cross arrangement" by a ring 23, which, with said tines, constitutes a universal-joint between the spider and the axle, whereby the spider and armor will be rotated synchronously with the axle and consequently also with hub 4 and tube 11, but which will allow certain movement between the armor and axle as required for "life" or cushion-efficiency between the tread and axle.

I am aware that changes in the form, construction, arrangement and combination of the several parts of my new wheel may be made and substituted for those herein shown and described without departing from the nature and principle of my invention.

Having thus described my invention, what I claim and desire to secure by Letters Patent is:

1. The combination with a wheel adapted to be mounted upon an axle, the wheel including an outer annular cushioning-member, of a tread-member annularly encircling said cushioning-member, and means adapted to provide a driving connection independent of the wheel between the tread-member and the axle, said means permitting movement of the tread-member substantially in all directions relatively to the axle and including a spider adapted to loosely encircle the axle and having a diameter excessively greater than the diameter of the axle, spokes between the tread-member and the spider, each spoke being fastened at one end to the tread-member and having independent slot-and-pin connection at its other end with the spider, and a universal joint device adapted to connect the spider with the axle.

2. A wheel structure including an annular tread-member, a spider adapted to loosely encircle an axle, spokes having connection at their ends with the tread-member and the spider, and means adapted to provide a driving-connection between the spider and the axle, said means including a universal joint for permitting movement of the spider and tread-member relatively to the axle.

3. A pneumatic wheel structure comprising a hub adapted to be mounted upon an axle, spokes pivotally connected at one end to the hub to swing in the plane of the wheel, an annular cushioning-member surrounding the spokes, yokes at the free ends of the spokes loosely engaging the cushioning-member, an annular arcuated protecting tread-member disposed around the cushioning-member, the tread-member being notched at its sides to movably accommodate said yokes, and means adapted to provide an independent driving-connection between the tread-member and the axle.

4. A pneumatic wheel structure comprising a hub adapted to be mounted upon an axle, spokes having pivotal connection at one end with the hub, an annular cushioning-member surrounding, and loosely engaged by the free ends of the spokes, an annular arcuated protecting tread-member disposed around the cushioning-member, and means adapted to provide an independent driving-connection between the tread-member and the axle, said means including a universal joint device for permitting movement of the tread-member relatively to the axle.

In testimony whereof, I have signed my name to this specification.

JAMES A. CARTER.